A BENCINI.
Coffee Pot.
No. 952.
Patented Sept. 27, 1838.
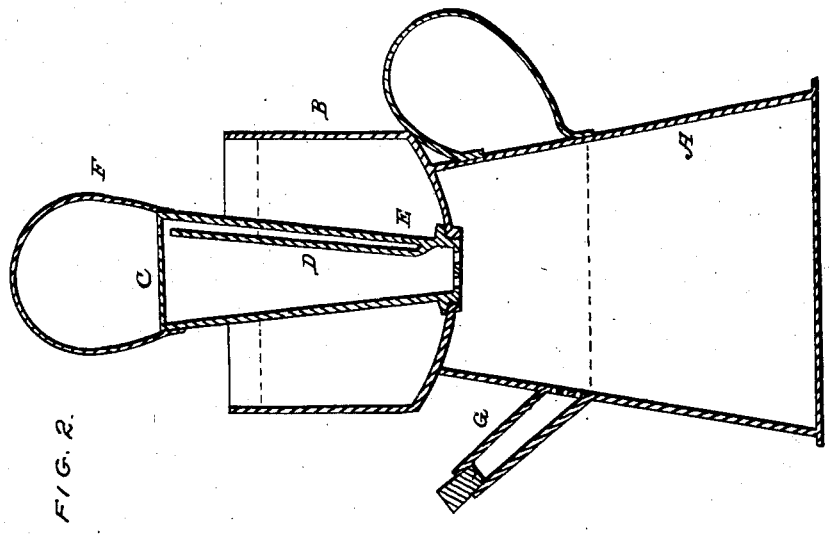
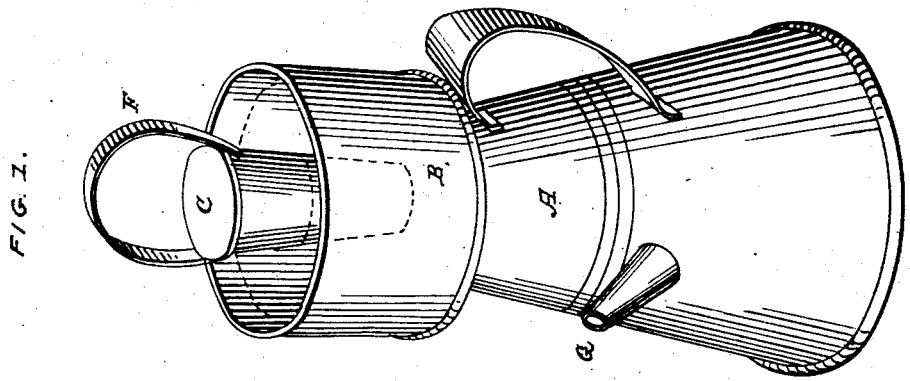

UNITED STATES PATENT OFFICE.

ANTONI BENCINI, OF MILTON, NORTH CAROLINA.

APPARATUS FOR MAKING COFFEE AND TEA.

Specification of Letters Patent No. 952, dated September 27, 1838.

*To all whom it may concern:*

Be it known that I, ANTONI BENCINI, of Mitton, in the county of Caswell and State of North Carolina, have invented a new and Improved Mode of Making Coffee and Tea, and I do hereby declare that the following is a full and exact description, reference being had to the annexed drawing of the same.

Figure 1 is a perspective view. Fig 2 is a section through the center.

The nature of my invention consists in providing a common coffee pot A of any given size with a receptacle or condenser B affixed on the top of the said coffee pot holding about one third of the quantity of the main pot. The receptacle has at the bottom screwthreads three inches in diameter confined to the bottom of the same with a stopper C sufficient in length to reach two inches above the top of the receptacle and three inches in diameter with a screw attached to the bottom of the same to fit and screw into the bottom of the receptacle or condenser so as to prevent the cold water from passing into the body of the pot until necessary. This stopper is also hollow with a division D in it to come within one-quarter of an inch of the top of the stopper. There is also a small hole E near the bottom of the stopper for the steam to pass through into the cold water in the receptacle. The stopper has a handle F at the top for the purpose of screwing or unscrewing the same. The spout G of the pot should be stopped with a cork or wooden stopper when boiling.

Any given quantity of ground coffee or tea is put into the pot which shall then be filled with boiling water to the strainer of the spout which should be so fixed as to make it two thirds full. Then screw in the stopper and fill the receptacle with cold water and set it on live coals for boiling. Let it boil until you discover steam arising from the top of the receptacle or condenser. When this is seen, which will usually be produced in fifteen or twenty minutes take it from the fire, unscrew the stopper so as for the water which has received the evaporation and flavor of the coffee or tea as the case may be to pass into the body of the pot, then unstop the spout and it is ready for use.

By making coffee or tea in the above described manner one-third of the quantity commonly used may be saved and coffee or tea of equal strength and superior taste and flavor is produced with the remaining two thirds.

What I claim as my invention, and desire to secure Letters Patent is—

The construction and use of an apparatus for making coffee or tea in which there is a receptacle for cold water for condensing the aromatic portion which escapes from the heated vessel, in the manner and for the purpose above set forth.

A. BENCINI.

Witnesses:
 JOEL MCLEAN,
 G. C. TOWNSEND.